United States Patent
Sodhi et al.

(10) Patent No.: US 9,626,316 B2
(45) Date of Patent: Apr. 18, 2017

(54) MANAGING SHARED RESOURCES BETWEEN MULTIPLE PROCESSING DEVICES

(71) Applicant: Intel Corporation, Santa Clara, CA (US)

(72) Inventors: Inder M. Sodhi, Folsom, CA (US); Joydeep Ray, Folsom, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 14/141,828

(22) Filed: Dec. 27, 2013

(65) Prior Publication Data

US 2015/0186313 A1 Jul. 2, 2015

(51) Int. Cl.
*G06F 13/36* (2006.01)
*G06F 9/52* (2006.01)

(52) U.S. Cl.
CPC ............... *G06F 13/36* (2013.01); *G06F 9/52* (2013.01)

(58) Field of Classification Search
CPC .................................. G06F 13/36; G06F 9/52
See application file for complete search history.

(56) References Cited

U.S. PATENT DOCUMENTS

| | | | |
|---|---|---|---|
| 2005/0010728 A1* | 1/2005 | Piry ................... | G06F 12/0831 711/147 |
| 2014/0089596 A1* | 3/2014 | McKenney ......... | G06F 12/0891 711/135 |
| 2014/0143497 A1* | 5/2014 | Olson ................. | G06F 12/0802 711/132 |

* cited by examiner

*Primary Examiner* — Eric Oberly
(74) *Attorney, Agent, or Firm* — Lowenstein Sandler LLP

(57) ABSTRACT

In accordance with embodiments disclosed herein, there is provided systems and methods for managing shared resources between multiple processing devices. The processor may include a first processing device comprising a first non-coherent hardware block (hb) including a non-coherent data and a second processing device comprising a second non-coherent hb including the non-coherent data. The processor may also include a first hb in communication with the first non-coherent hb and the second non-coherent hb to track and share the non-coherent data between the first and the second processing devices.

20 Claims, 14 Drawing Sheets

MANAGING SHARED RESOURCES BETWEEN MULTIPLE PROCESSING DEVICES

TECHNICAL FIELD

The embodiments of the disclosure relate generally to processing devices and, more specifically, relate to managing shared resources between multiple processing devices.

BACKGROUND

A peripheral component interconnect (PCI) is a local computer bus for attaching hardware/processing devices in a computer. The PCI bus supports functions found on a processor bus in a standardized format that is independent of any particular processor. The PCI bus communicates with the operation system using device driver software. When there are two or more hardware/processing devices performing and/or rendering the same function, the PCI bus relies on the device driver software to maintain coherency of workload between the two or more hardware/processing devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Disclosed herein are embodiments for managing shared resources between multiple processing devices. In one embodiment, the resources may be used by either of the multiple processing devices.

As discussed above, when there are two or more hardware/processing devices performing and/or rendering the same function, the PCI bus relies on the device driver software to maintain coherency of workload between the two or more hardware/processing devices. As such, the burden of coherency and traffic management between the processing devices is on the software. Such software is extremely complicated when coordinating coherency between multiple processing devices, which results in lower performance than maximum potential of the system.

Embodiments of the disclosure take advantage of the "un-core" components of the processing devices that include all the information that is needed to track data being used in each of the processing devices and maintain coherency of workload between the processing devices in order to manage the shared resources between the devices completely in the hardware.

In some embodiments, the data is non-coherent data in which one processing element can read the same old data from a given memory location after a write of the data is made in the same memory location by other processing elements. In one embodiment, a first hardware block tracks the non-coherent data in each of the multiple processing devices and shares the non-coherent data between the multiple processing devices.

In some embodiments, the data is coherent data in which corresponding memory locations for each processing element in a multi-core processor always share and update the cached data. In one embodiment, a second hardware block tracks the coherent data in each of the multiple PCI devices and coordinates the coherent data sharing and synchronizing between the multiple processing devices.

Figure 1:
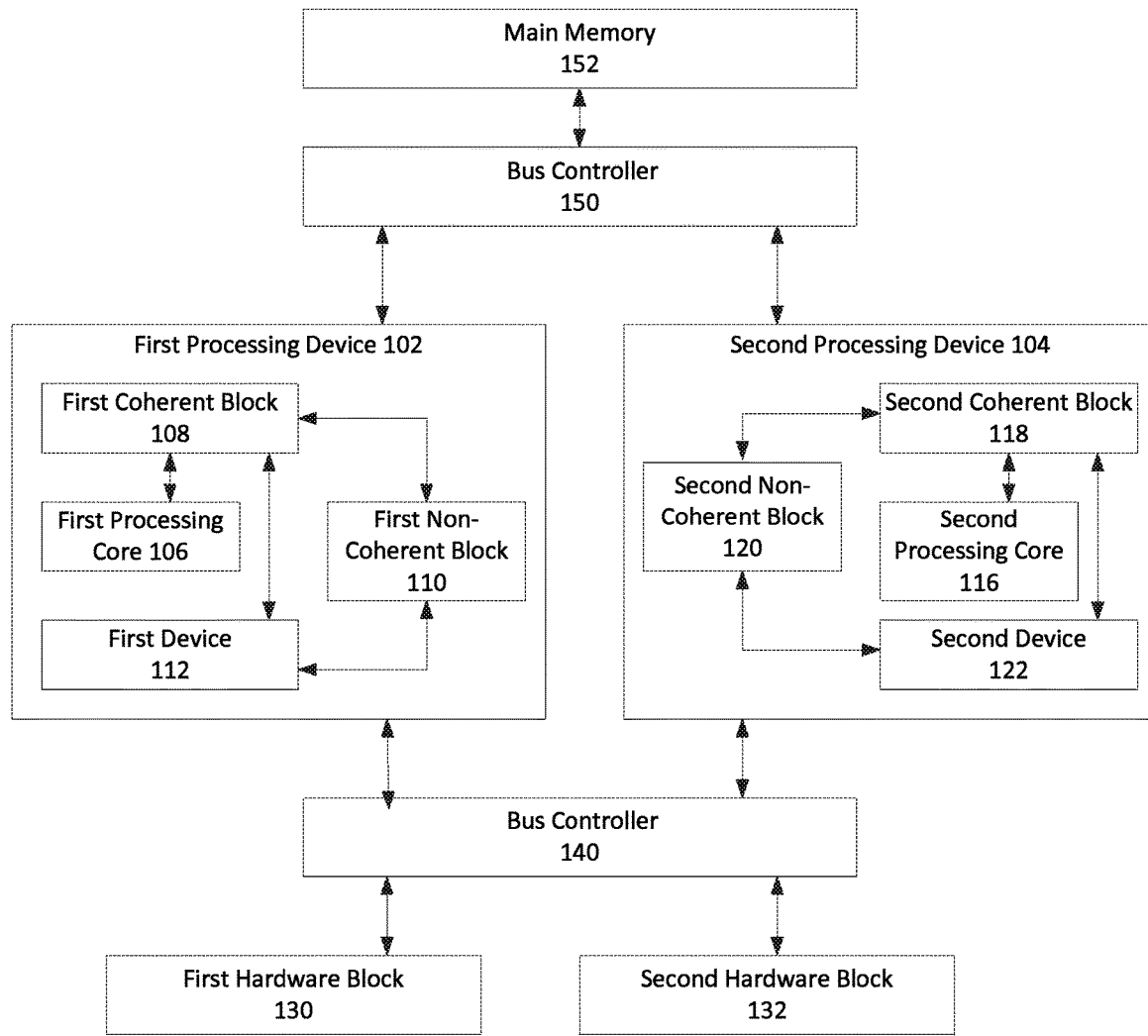
FIG. 1 is a block diagram of a system architecture, according to an embodiment of the disclosure.

FIG. 1 illustrates an exemplary architecture of a computer system 100 according to one embodiment of the disclosure. The computer system 100 includes at least a first processing device 102 and a second processing device 104.

The first processing device 102 includes a first processing core 106 and a number of other modules, collectively referred to as the "un-core". A processing core is a physical processor package having one or more processor cores. In one embodiment, the processing core is a central processing unit (CPU) that reads and executes program instructions. In one embodiment, the processing core is a graphics processing engine (GPU) that reads and executes custom instructions. Such instructions include but are not limited to add data, move data and branch data. The first processing device 102 may have more than one processing core (multi-core processor). First Processing core 106, in various implementations, may provide in-order processing execution or out-of-order processing execution. In an illustrative example, first processing core 106 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers and/or one or more dynamically allocated physical registers using a register renaming mechanism (e.g., the use of a register alias table (RAT), a reorder buffer (ROB) and a retirement register file), as illustrated by FIGS. 5 and 6.

The first processing core 106 may be communicatively coupled to a first coherent hardware block (chb), 108. A chb is a hardware-implemented block or component, which includes coherent data adhering to memory coherence. In a distributed shared memory system, coherent memory may be distributed across different processors/devices on the platform. Memory coherency occurs when two or more processors share a common memory location. Memory coherence is a condition in which corresponding memory locations for each processing element in a multi-core processor always contain the same cached data.

For example, in multi-core processors, two or more processing elements (e.g., processing cores or CPUs) work concurrently and may simultaneously access the same memory location to perform reads or writes. Provided a processing element does not alter the data at the affected location, all of the processing elements can share and cache the data without any problems. However, if one of the processing elements changes the data in the shared location and does not inform the other processing elements of the change, the other processing elements might use the outdated version of the data that remains in their local caches. In a multi-core processing system, a memory coherence protocol notifies all the processing elements of changes to the shared data, thereby ensuring that all copies of the data remain consistent.

The first chb 108 may be communicatively coupled to a first non-coherent hardware block (nchb) 110. An nchb is a hardware-implemented block or component, which includes non-coherent data having memory incoherence. Memory incoherence is a condition in which one processing element can read the same old data from a given memory location after a write of the data is made in the same memory location by other processing elements.

The first processing device 102 may also include an IA compute core that is running IA software including the device driver for a first device 112, which may be communicatively coupled to the first chb 108 and the first nchb 110. The first device 112 may include, but not limited to a graphics engine that is responsible for partial frame updates in the system.

The second processing device 104 includes a second processing core 116 and a number of other modules (the "un-core"). In one embodiment, the processing core is a central processing unit (CPU) that reads and executes program instructions. Such instructions include but are not limited to add data, move data and branch data. The second processing device 104 may have more than one processing core (multi-core processor). The second processing core 116, in various implementations, may provide by in-order processing execution or out-of-order processing execution. In an illustrative example, the second processing core 116 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, and/or one or more dynamically allocated physical registers using a register renaming mechanism (e.g., the use of a register alias table (RAT), a reorder buffer (ROB) and a retirement register file), as illustrated by FIGS. 5 and 6.

The second processing core 116 may be communicatively coupled to a second chb 118. The second chb 118 may be communicatively coupled to a second nchb 120. The second processing device 104 may also include an IA compute core that is running IA software including the device driver for a second device 122. The second device, 122 may be communicatively coupled to the second chb 118 and the second nchb 120. The second device 122 may include, but not limited to another graphics device that is responsible for the partial frame updates in another section of the display frame than the first device 112.

The computer system 100 includes a first hardware block (hb) 130 to track non-coherent data in the first nchb 110. The first hb 130 may be communicatively coupled to the first and the second processing devices 102 and 104 respectively via a bus controller 140. A bus controller 140 is a processing unit including logic for communicating with the first and second processing devices 102 and 104 respectively. In one embodiment, the first hb 130 is communicatively coupled to the first nchb 110 of the first processing device 102. In one embodiment, the first hb 130 is communicatively coupled to the second nchb 120 of the second processing device 104. In such an implementation, the first hb 130 keeps track of non-coherent data both in the first nchb 110 and the second nchb 120.

The first hb 130 may include a cross-stack design structure that maintains a simple "address-based" hash function implementation to route and share non-coherent data between the two processing devices 102 and 104. In one embodiment, the first hb 130 implements a cross-stack hardware structure that filters the non-coherent data traffic from a data flow. As an example, the first hb 130 filters the tracked non-coherent data in the first nchb 110 of the first processing device 102. Similarly, in another example, the first hb filters the tracked non-coherent data in the second nchb 120 of the second processing device 104.

In one embodiment, the first hb 130 implements the cross-stack hardware structure to assign the appropriate processing device to a particular section of non-coherent data stack of the structure. As an example, the first hb 130 assigns the first and the second processing devices to a particular section of the non-coherent data stack. In one embodiment, the first hb 130 also enables sharing of the non-coherent data between the first and the second processing devices 102, 104. For example, the first hb 130 provides the non-coherent data from the first nchb 110 of the first processing device 102 to the second nchb 120 of the second processing device 104 via the section of the non-coherent data stack of the first hb 130. Similarly, in another example, the first hb 130 provides, via the section of the non-coherent data stack of the first hb 130, the non-coherent data from the second nchb 120 of the second processing device 104 to the first nchb 110 of the first processing device 102.

The computer system 100 may further include a main memory 152, which may be communicatively coupled to the first and the second processing devices 102 and 104 respectively via a bus controller 150. A bus controller 150 is a processing unit including logic for communicating with the first and second processing devices 102 and 104 respectively. In one embodiment, the main memory 152 is communicatively coupled to the first chb 108 of the first processing device 102. In another embodiment, the main memory 152 is also communicatively coupled to the second chb 118 of the second processing device 104. As such, both the first chb 108 and the second chb 118 share the same common memory, i.e. the main memory 152.

The computer system 100 also includes a second hb 132 to track coherent data in the first chb 108. The second hb 132 may be communicatively coupled to the first and the second processing devices 102 and 104 respectively via the bus controller 140. In one embodiment, the second hb 132 is communicatively coupled to the first chb 108 of the first processing device 102. In such an implementation, the second hb 132 tracks coherent data in the first chb 108. In one embodiment, the second hb 132 is communicatively coupled to the second chb 118 of the second processing device 104. In such an implementation, the second hb 132 tracks coherent data in the second chb 118.

In one embodiment, the second hb 132 also enables coordinating coherent data between the first and the second processing devices 102 and 104. In one embodiment, the second hb 132 coordinates coherent data between the first chb 108 and the second chb 118 by using hardware design structures such as semaphores. The second hb 132 may include multi-chip coherency structures type look up table based semaphores for coherent data and memory management. A semaphore structure is implemented as a "lock" and "release" producer/consumer design protocol to maintain and share the latest update of a data structure or some location in memory.

In one example, the second hb 132 locks the coherent data of the first chb 108 of the first processing device 102 in the main memory 152. As such, the locked coherent data of the first chb 108 is unavailable for any types of reads, writes and/or updates. In one example, the second processing device 104 is prevented from read, write and/or update to the coherent data of the first chb 108. In another example, the second hb 132 locks the coherent data of the second chb 118 of the second processing device 104 in the main memory 152. As such, the locked coherent data of the first second chb 118 is unavailable for any types of reads, writes and/or updates. In one example, the first processing device 102 is prevented from read, write and/or update to the coherent data of the second chb 118.

In one example, the second hb 132 releases the locked coherent data of the first chb 108 of the first processing device 102 in the main memory 152. As such, the coherent data of the first chb 108 is now available for any types of reads, writes and/or updates. In one example, the second processing device 104 has access to read, write and/or update to the coherent data of the first chb 108. In another example, the second hb 132 releases the locked coherent data of the second chb 118 of the second processing device 104 in the main memory 152. As such, the locked coherent data of the second chb 118 is available for any types of reads, writes and/or updates. In one example, the first processing device 102 have access to read, write and/or update to the coherent data of the second chb 118.

Figure 2:
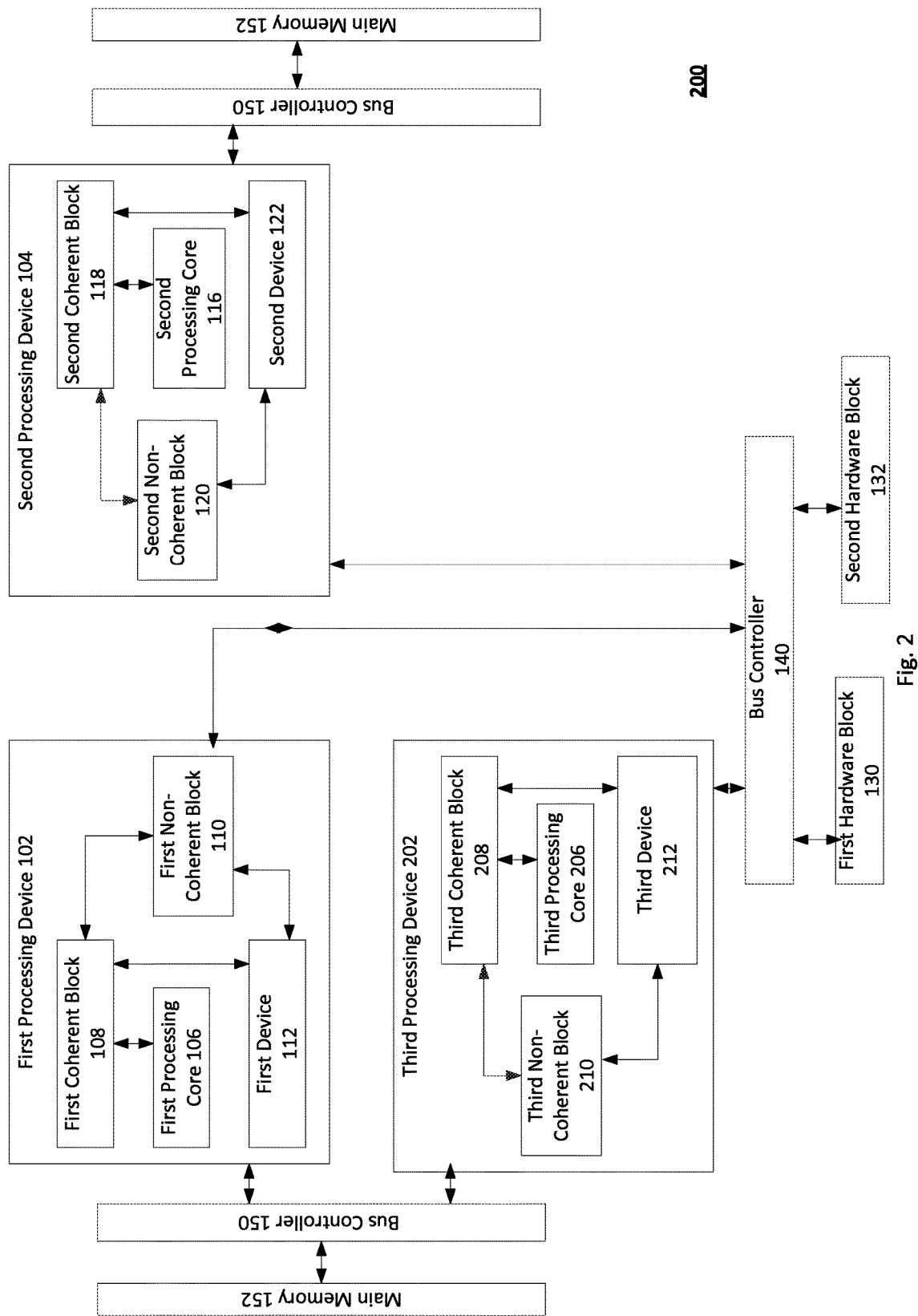
FIG. 2 is a block diagram of a system architecture, according to an embodiment of the disclosure.

FIG. 2 illustrates an exemplary architecture of a computer system 200 according to another embodiment of the disclosure. The computer system 200 includes at least the first hb 130, the second hb 132 and the first and the second processing devices 102 and 104 respectively of the computer system 100 of FIG. 1 and a third processing device 202.

The third processing device 202 includes a third processing core 206 and a number of other modules, collectively referred to as the "un-core". In one embodiment, the processing core is a central processing unit (CPU) that reads and executes program instructions. Such instructions include but are not limited to add data, move data and branch data. The second processing device 104 may have more than one processing core (multi-core processor). The third processing core 206 in various implementations may provide in-order processing execution or out-or-order processing execution. In an illustrative example, the third processing core 206 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, and/or one or more dynamically allocated physical registers using a register renaming mechanism (e.g., the use of a register alias table (RAT), a reorder buffer (ROB) and a retirement register file), as illustrated by FIGS. 5 and 6.

The third processing device 202 may also include an IA compute core that is running IA software including the device driver for a third device 212. The third device 212 may be communicatively coupled to a third chb 208 and a third nchb 210. Furthermore, the third chb 208 may be communicatively coupled to a third nchb 210. The third device 212 may include, but is not limited to, another graphics device that is responsible for the partial frame updates in another section of the display frame than the first and the second devices 112 and 122. The first hb 130 may be communicatively coupled to the third processing device 202 via the bus controller 140. In one embodiment, the first hb 130 is communicatively coupled to the third nchb 210 of the third processing device 202. In such an implementation, the first hb 130 keeps track of non-coherent data in the third nchb 210. As discussed above, the first hb 130 may keep track of non-coherent data both in the first nchb 110 and the second nchb 120.

As discussed above, the first hb 130 may implement a cross-stack hardware structure that filters the non-coherent traffic from the data flow and assign the appropriate processing device to a particular section of non-coherent data stack. As discussed above, as an example, the first hb 130 filters the tracked non-coherent data in the first nchb 110 of the first processing device 102. Also, as discussed above, in another example, the first hb filters the tracked non-coherent data in the second nchb 120 of the second processing device 104. Similarly, in a further example, the first hb 130 filters the tracked non-coherent data in the third nchb 120 of the third processing device 202.

As discussed above, the first hb 130 may implements the cross-stack hardware structure to assign the appropriate processing device to a particular section of non-coherent data stack of the structure. As an example, the first hb 130 assigns the first, second and third processing devices 102, 104, 202 a particular section of the non-coherent data stack.

In one embodiment, the first hb 130 also enables sharing of the non-coherent data between the first, second and the third processing devices 102, 104. 202. For example, the first hb 130, via the section of the non-coherent data stack of the first hb 130, provides the non-coherent data from the first nchb 110 of the first processing device 102 to the second nchb 120 of the second processing device 104 and the third nchb 208 of the third processing device 202. Similarly, in another example, the first hb 130 provides, via the section of the non-coherent data stack of the first hb 130, the non-coherent data from the second nchb 120 of the second processing device 104 to the first nchb 110 of the first processing device 102 and the third nchb 208 of the third processing device 202. In a further example, the first hb 130 provides, via the section of the non-coherent data stack of the first hb 130, the non-coherent data from the third nchb 208 of the third processing device 202 to the first nchb 110 of the first processing device 102 and the second nchb 120 of the second processing device 104.

The second hb 132 may be communicatively coupled to the third processing device 202 via the bus controller 140. In one embodiment, the second hb 132 is communicatively coupled to the third chb 208 of the third processing device 202. In such an implementation, the second hb 132 tracks coherent data in the third chb 208.

In one embodiment, the second hb 132 also enables coordinating coherent data between the first, second and third processing devices 102, 104 and 202. In one embodiment, the second hb 132 coordinates coherent data between the first chb 108, the second chb 118 and the third chb 208 by using hardware design structures such as semaphores. The second hb 132 may include multi-chip coherency structures type look up table based semaphores for coherent data and memory management. A semaphore structure is implemented as a "lock" and "release" producer/consumer design protocol to maintain and share the latest update of a data structure or some location in memory.

In one example, the second hb 132 locks the coherent data of the first chb108 of the first processing device 102 in the main memory 152. As such, the locked coherent data of the first chb 108 is unavailable for any types of reads, writes and/or updates. In one example, the second processing device 104 and the third processing device 202 are prevented from read, write and/or update to the coherent data of the first chb 108. In another example, the second hb 132 locks the coherent data of the second chb118 of the second processing device 104 in the main memory 152. As such, the locked coherent data of the second chb 132 is unavailable for any types of reads, writes and/or updates. In one example, the first processing device 102 and the third processing device 202 are prevented from read, write and/or update to the coherent data of the second chb 118. In a further example, the second hb 132 locks the coherent data of the third chb 208 of the third processing device 202 in the main memory 152. As such, the locked coherent data of the third chb 208 is unavailable for any types of reads, writes and/or updates. In one example, the first processing device 102 and the second processing device 104 are prevented from read, write and/or update to the coherent data of the third chb 208.

In one example, the second hb 132 releases the locked coherent data of the first chb 108 of the first processing device 102 in the main memory 152. As such, the coherent data of the first chb 108 is now available for any types of reads, writes and/or updates. In one example, the second and the third processing devices 104, 202 have access to read, write and/or update to the coherent data of the first chb 108. In another example, the second hb 132 releases the locked coherent data of the second chb 118 of the second processing device 104 in the main memory 152. As such, the locked coherent data of the second chb 108 is available for any types of reads, writes and/or updates. In one example, the first and the third processing devices 102, 202 have access to read, write and/or update to the coherent data of the second chb 118. In a further example, the second hb 132 releases the locked coherent data of the third chb 208 of the third processing device 202 in the main memory 152. As such, the locked coherent data of the third chb 208 is available for any types of reads, writes and/or updates. In one example, the first and the second processing devices 102, 104 have access to read, write and/or update to the coherent data of the third chb 208.

Although not shown, in one embodiment, there could be additional sets of processing devices in a system. The hardware structures for the first hb 130 for non-coherent control and for the second hb 132 for coherent traffic have the ability to scale to more than two processing devices as shown in FIG. 2.

The main memory 152 may be communicatively coupled to the third processing device 202 via the bus controller 150. In one embodiment, the main memory 152 is communicatively coupled to the third chb 208 of the third processing device 202. As such, both the second chb 118 and the third chb 208 share the same common memory, i.e. the main memory 152.

Figure 3:
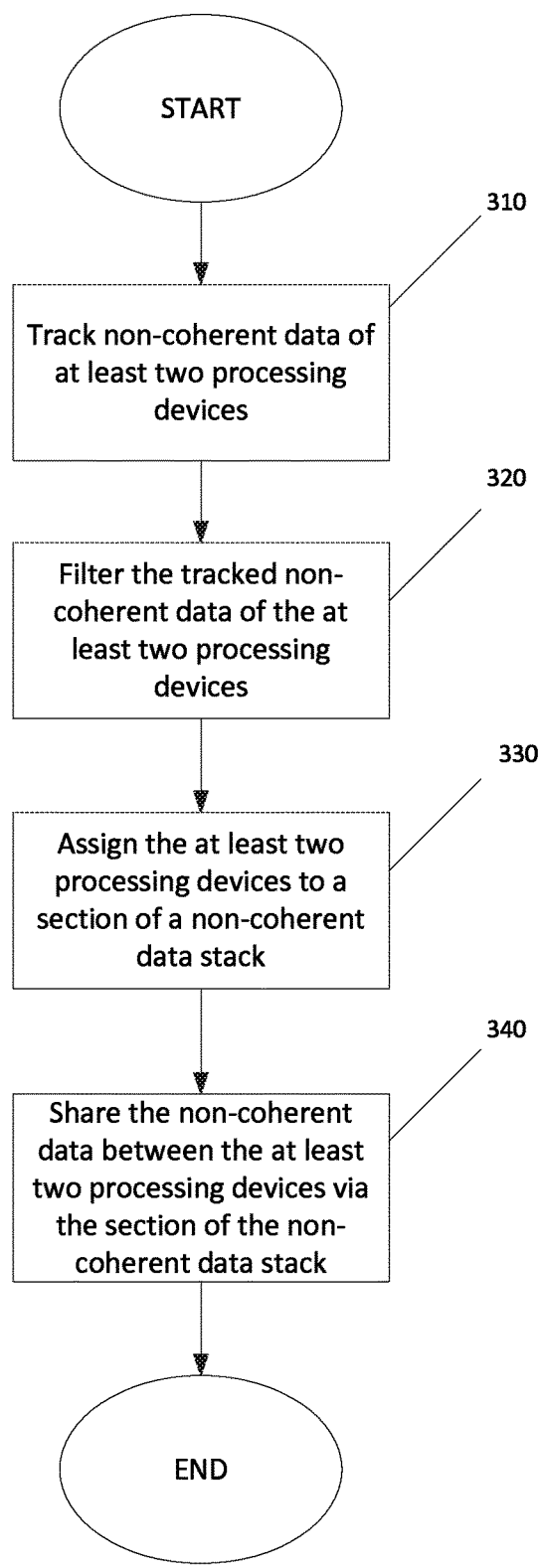
FIG. 3 is a flow diagram illustrating an example of a method for managing shared resources according to an embodiment of the present disclosure.

FIG. 3 is a flow diagram illustrating a method 300 of managing shared resources, according to one embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by processing logic of the first hb 130 described above with respect to FIG. 1. In another embodiment, the method 300 may be performed by the first processing core 106 of the first processing device 102, the second processing core 116 of the second processing device 104, or an operating system (OS) executing on one or both of the first and/or the second processing devices 102 and 104 respectively.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 310 of method 300, processing logic may track non-coherent data of at least two processing devices. For example, the first hb 130 tracks the non-coherent data in the first nchb 110 of the first processing device 102 and in the second nchb 120 of the second processing device 104. At block 320, the processing logic filters the tracked non-coherent data of the at least two processing devices. For example, the first hb 130 filters the tracked non-coherent data in the first nchb 110 of the first processing device 102 and in the second nchb 120 of the second processing device 104.

At block 330, the processing logic assigns the first and the second processing devices to a section of a non-coherent data stack. In one embodiment, the processing logic is a non-coherent data stack. At block 340, the processing logic may provide access to share the non-coherent data between the two processing devices via the section of the non-coherent data stack. For example, the first hb 130, via the section of the non-coherent data stack, provides access to the non-coherent data from the first nchb 110 of the first processing device 102 to the second nchb 120 of the second processing device 104. Similarly, in another example, the first hb 130, via the section of the non-coherent data stack, provides the non-coherent data from the second nchb 120 of the second processing device 104 to the first nchb 110 of the first processing device 102.

Figure 4:
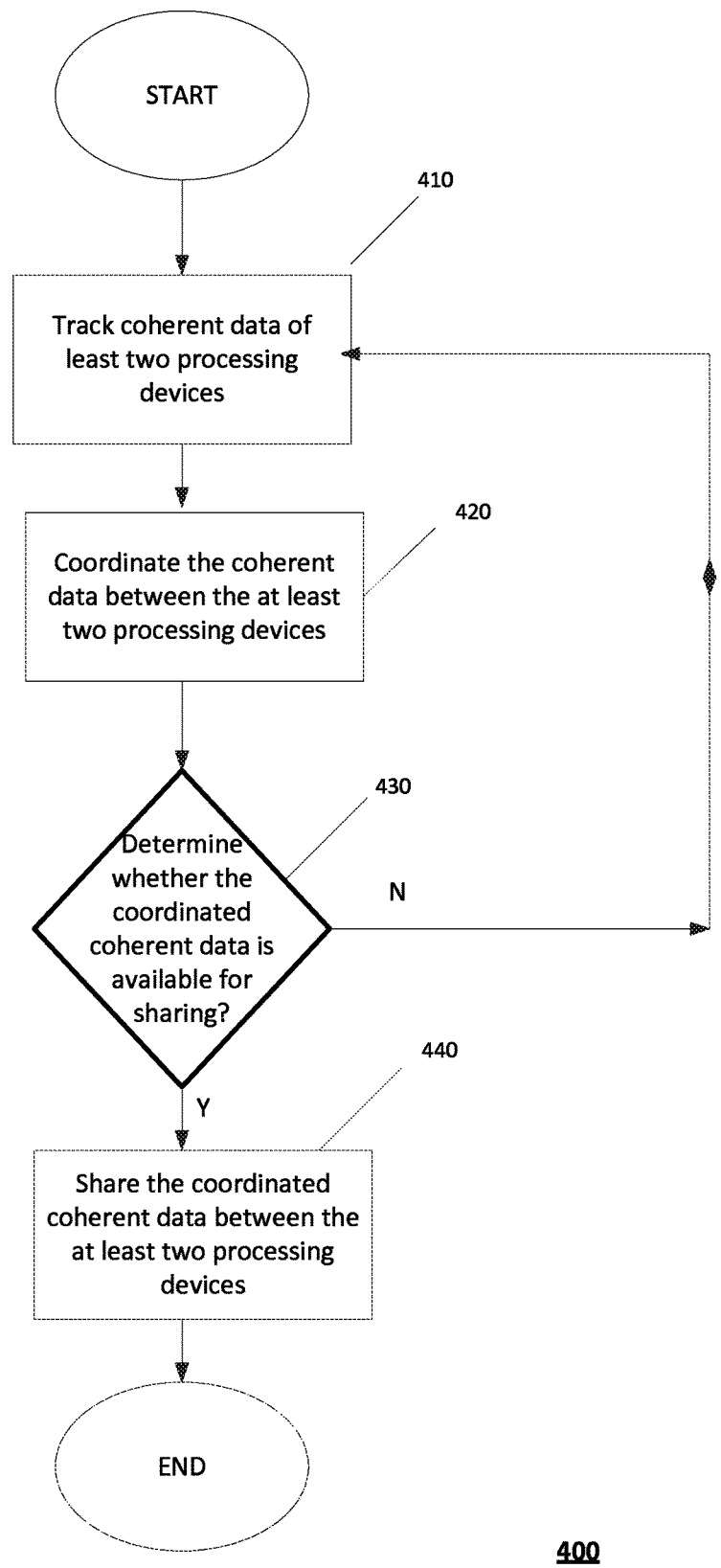
FIG. 4 is a flow diagram illustrating an example of a method for managing shared resources according to an embodiment of the present disclosure.

FIG. 4 is a flow diagram illustrating a method 400 of managing shared resources, according to one embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the second hb 132 described above with respect to FIG. 1. In another embodiment, the method 400 may be performed by the first processing core 106 of the first processing device 102, the second processing core 116 of the second processing device 104 or an operating system (OS) executing on one or both of the first and/or the second processing devices 102 and 104 respectively.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 410 of method 400, processing logic may track coherent data between at least two processing devices. For example, the second hb 132 tracks the coherent data in the first chb 108 of the first processing device 102 and in the second chb 118 of the second processing device 104.

At block 420, the processing logic may coordinate the coherent data between the two processing devices. For example, the second hb 132 coordinates coherent data between the first chb 108 of the first processing device 102 and the second chb 118 of the second processing device 104. In one embodiment, the processing logic coordinates coherent data between the first chb 108 and the second chb 118 by using hardware design structures such as semaphores. The processing logic may include multi-chip coherency structures type look up table based semaphores for coherent data and memory management. A semaphore structure is implemented as a "lock" and "release" producer/consumer design protocol to maintain and share the latest update of a data structure or some location in memory.

In one example, the coherent data of the first chb 108 of the first processing device 102 is locked in the main memory 152, thus preventing the second processing device 104 to perform any types of read, writes and/or updates. In another example, the coherent data of the second chb 118 of the second processing device 104 is locked in the main memory 152, thus preventing the first processing device 102 to perform any types of reads, writes and/or updates. In one example, the coherent data of the first chb 108 of the first processing device 102 is released in the main memory 152, thus allowing access of the coherent data of the first chb 108 to the second processing device 104. In another example, the coherent data of the second chb 118 of the second processing device 104 is released in the main memory, 152, thus allowing access of the coherent data of the second chb 118 to the first processing device 102.

At block 430, the processing logic determines whether the coordinated coherent data is available for sharing. At block 440, the processing logic shares the coordinated coherent data between the two processing devices when it is determined that the coordinated coherent data is available for sharing. In one embodiment, the coordinated coherent data available for sharing when the coherent data is released in the main memory 152. The method 400 returns to block 410 when it is determined that the coordinated coherent data is not available for sharing. In one embodiment, the coordinated coherent data is not available for sharing when the coherent data is locked in the main memory 152.

Figure 5A:
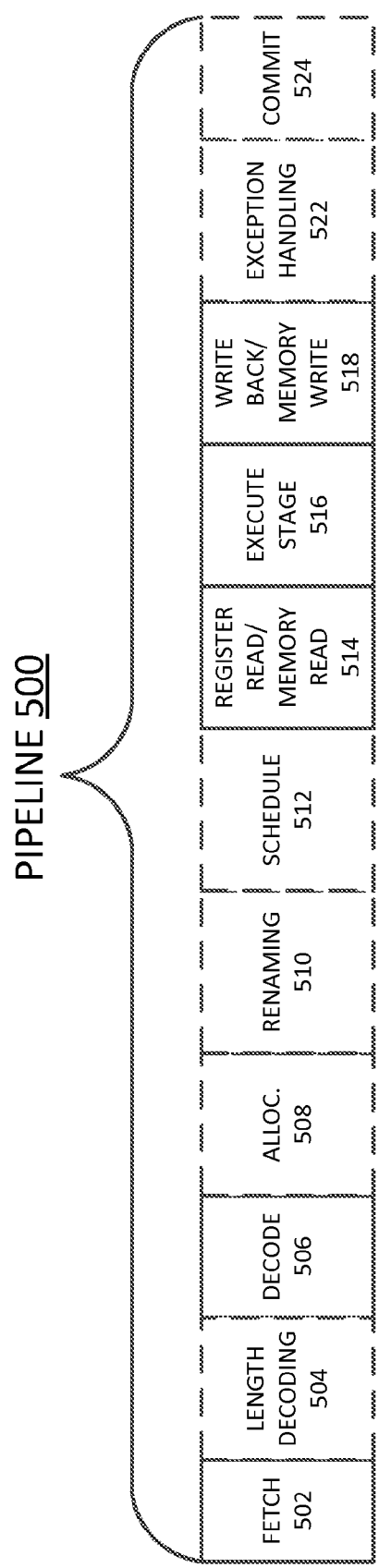
FIG. 5A is a block diagram illustrating an exemplary in order pipeline and an exemplary register renaming, out-of-order issue/execution pipeline in accordance with described embodiments.
Figure 5B:
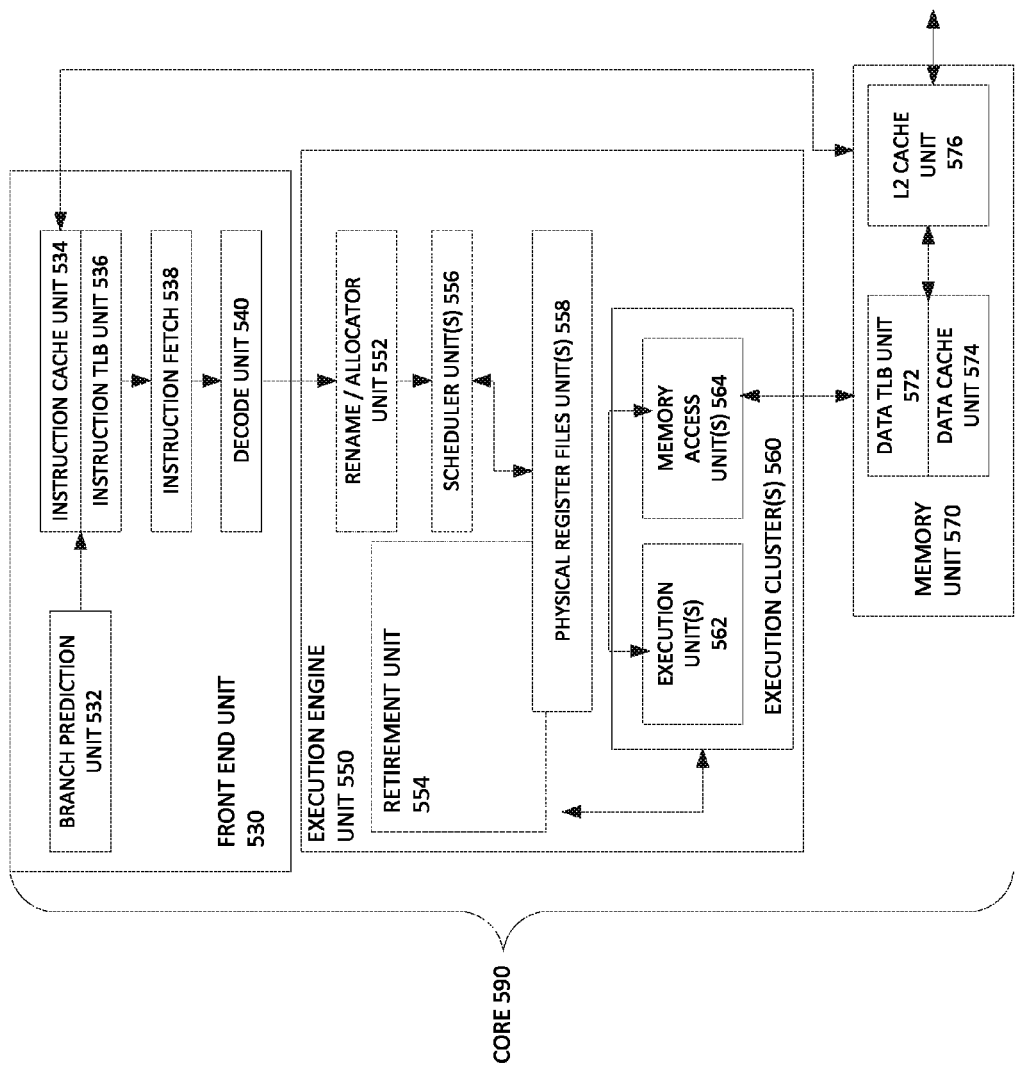
FIG. 5B is a block diagram illustrating both an exemplary embodiment of an in-order architecture core and an exemplary register renaming, out-of-order issue/execution architecture core to be included in a processor in accordance with described embodiments.
Figure 6:
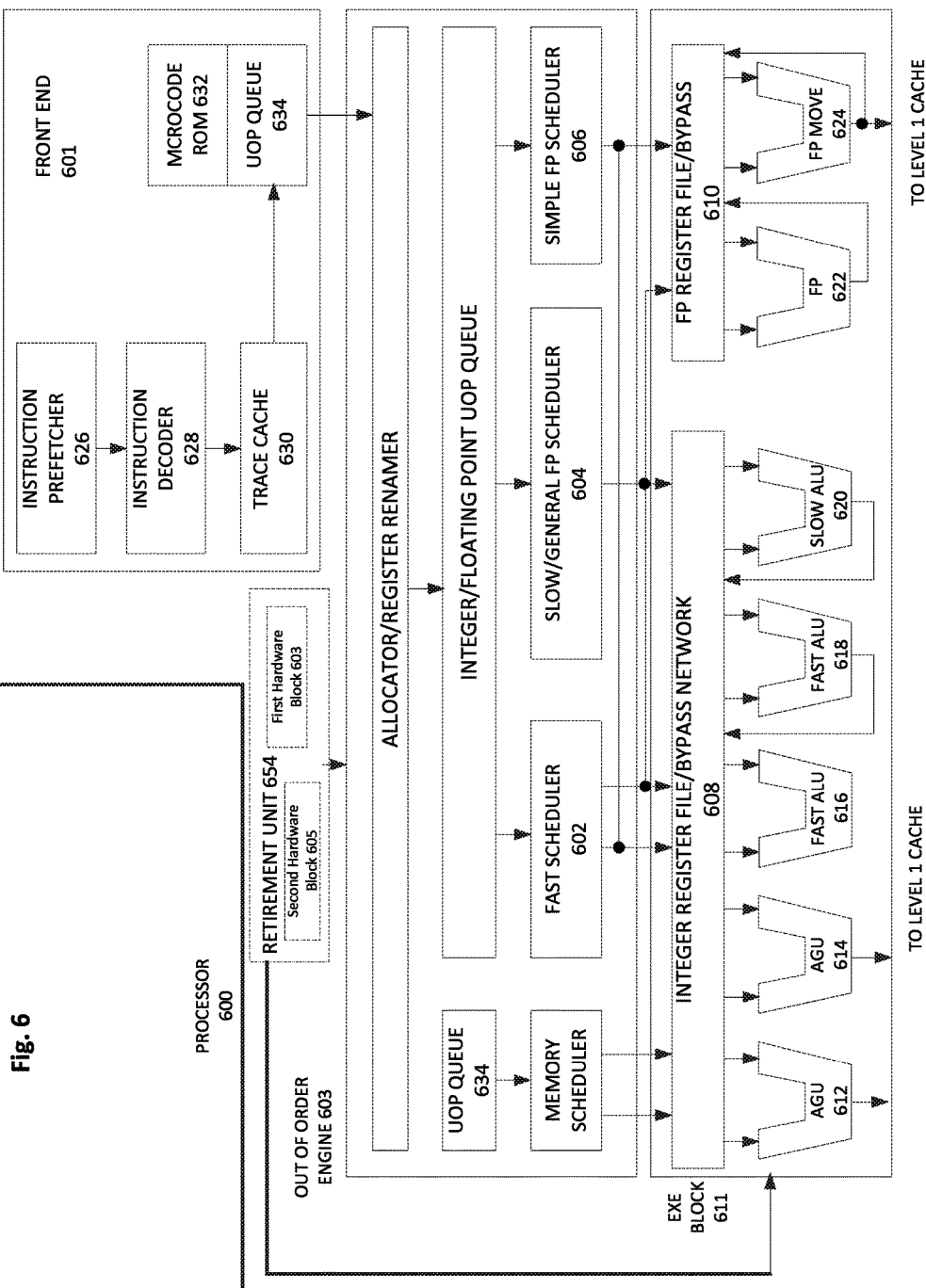
FIG. 6 is a block diagram illustrating a processor according to one embodiment.

FIG. 5A is a block diagram illustrating an in-order pipeline and a register re-naming stage, out-of-order issue/execution pipeline of a processor managing shared resources between multiple processing devices according to at least one embodiment of the invention. FIG. 5B is a block diagram illustrating an in-order architecture core and a register renaming logic, out-of-order issue/execution logic to be included in a processor according to at least one embodiment of the invention. The solid lined boxes in FIG. 5A illustrate the in-order pipeline, while the dashed lined boxes illustrates the register renaming, out-of-order issue/execution pipeline. Similarly, the solid lined boxes in FIG. 5B illustrate the in-order architecture logic, while the dashed lined boxes illustrates the register renaming logic and out-of-order issue/execution logic.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the stages are provided in a different order and different stages may be considered in-order and out-of-order.

In FIG. 5B, arrows denote a coupling between two or more units and the direction of the arrow indicates a direction of data flow between those units. FIG. 5B shows processor core 590 including a front end unit 530 coupled to an execution engine unit 550, and both are coupled to a memory unit 70.

The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to a level 2 (L2) cache unit 576 in the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 38 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6 is a block diagram illustrating a micro-architecture for a processor 600 that includes logic circuits to perform instructions in accordance with one embodiment of the invention. In one embodiment, processor 600 manages shared resources between multiple processing devices. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 601 is the part of the processor 600 that fetches instructions to be executed and prepares them to be used later in the processor pipeline. The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others use several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606 determine when a uop is ready to execute based on the readiness of their dependent input register operand sources and the availability of the execution resources the uops use to complete their operation. The fast scheduler 602 of one embodiment can schedule on each half of the main clock cycle while the other schedulers can schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 66 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions use to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620 are described in the context of performing integer operations on 64 bit data operands. In alternative embodiments, the ALUs 616, 618, 620 can be implemented to support a variety of data bits including 16, 32, 128, 256, etc. Similarly, the floating point units 622, 624 can be implemented to support a range of operands having bits of various widths. For one embodiment, the floating point units 622, 624 can operate on 128 bits wide packed data operands in conjunction with SIMD and multimedia instructions.

In one embodiment, the uops schedulers 602, 604, 606 dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 600 may include a retirement unit 654 coupled to the execution block 611. The retirement unit 654 may include a first hb 203 to track non-coherent data and to share the non-coherent data between multiple processing devices according to embodiments of the invention. The retirement unit 654 may also include a second hb 205 to coordinate coherent data between the multiple processing devices according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 7:
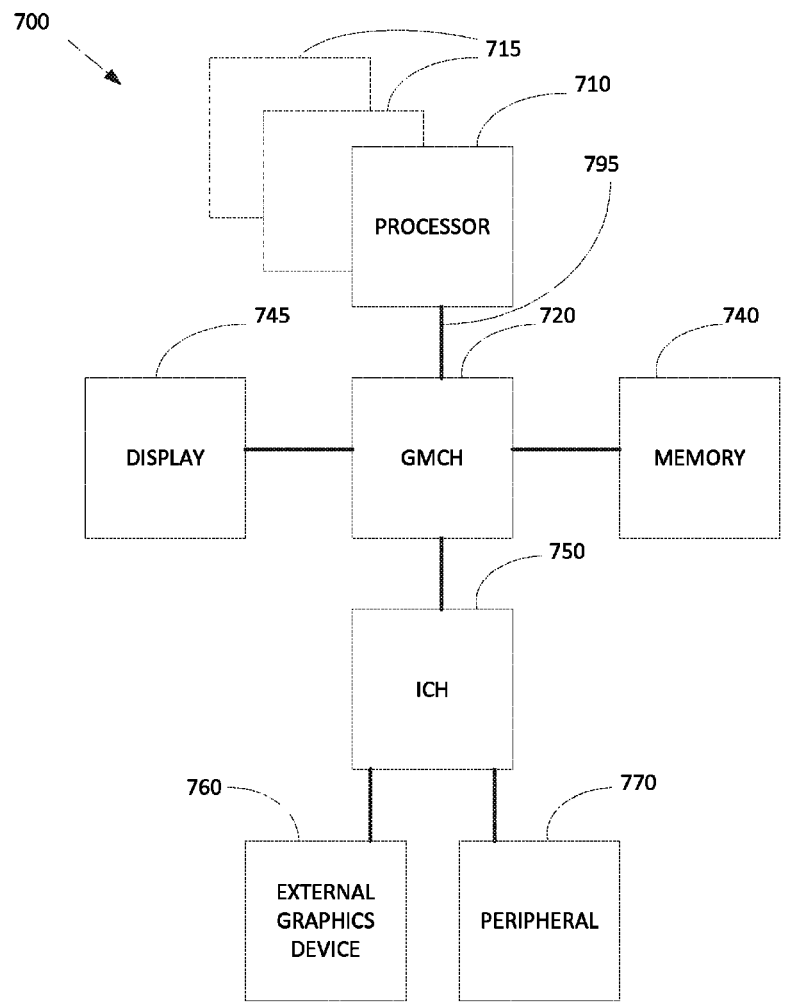
FIG. 7 illustrates a block diagram of a computer system according to one embodiment.

Referring now to FIG. 7, shown is a block diagram of a system 700 in accordance with one embodiment of the invention. The system 700 may include one or more processors 710, 715, which are coupled to graphics memory controller hub (GMCH) 720. The optional nature of additional processors 715 is denoted in FIG. 7 with broken lines. In one embodiment, processors 710, 715 manage shared resources between multiple processing devices.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural thermal, power consumption characteristics, and the like. These differences may effectively manifest themselves as asymmetry and heterogeneity amongst the processors 710, 715. For at least one embodiment, the various processors 710, 715 may reside in the same die package.

Figure 8:
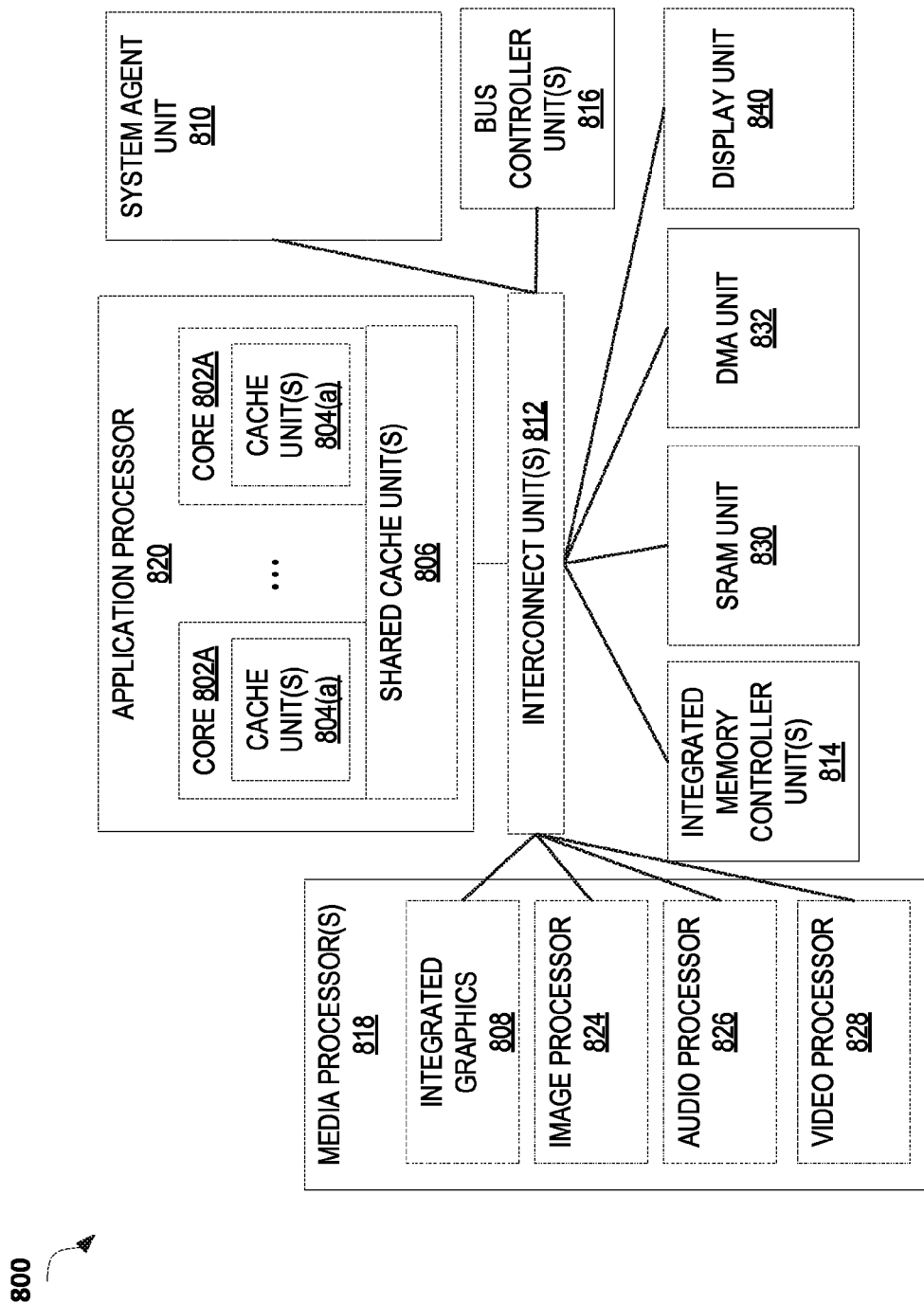
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include a first hardware block and a second hardware block as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof.

In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
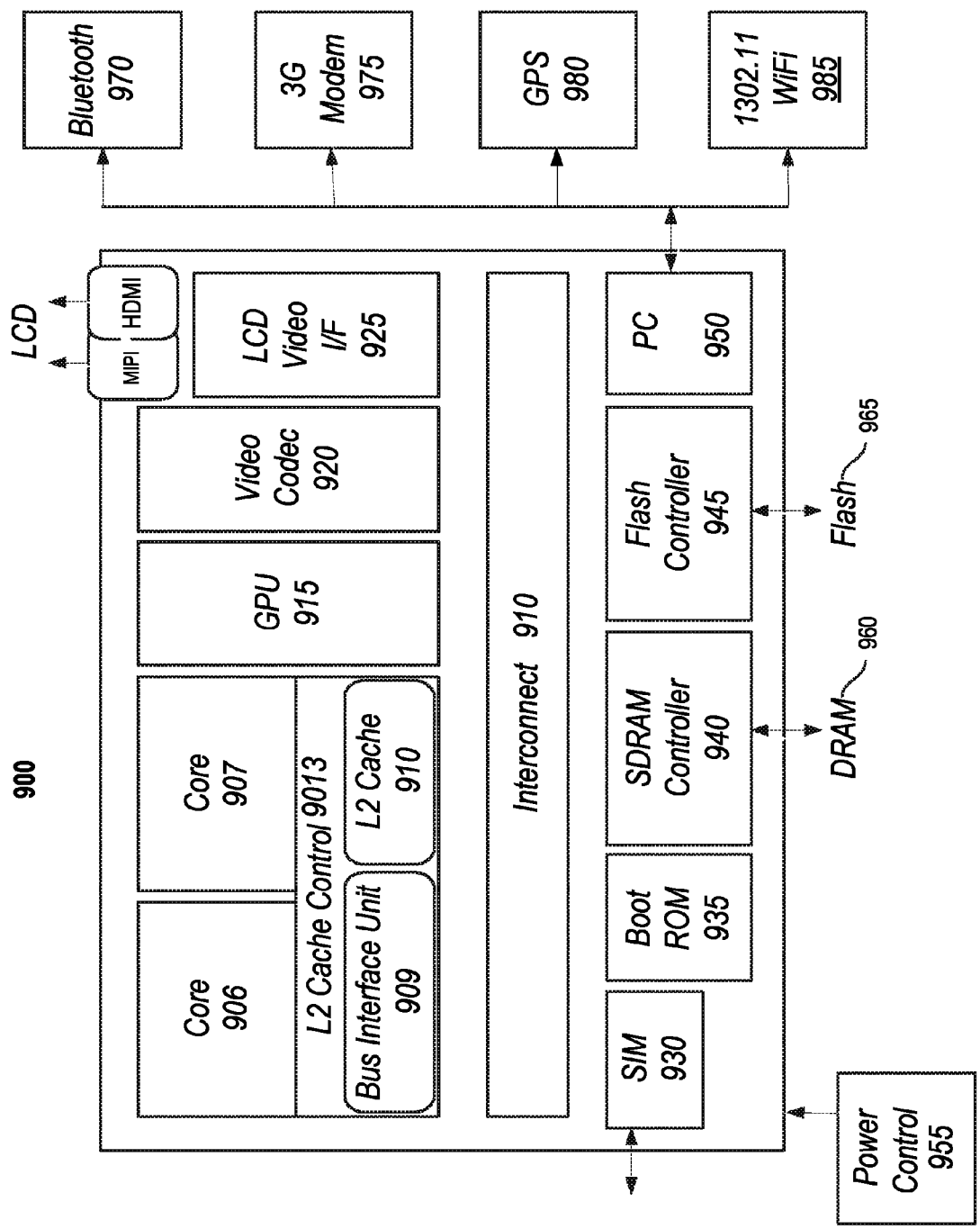
FIG. 9 is a block diagram of an embodiment of a system on-chip (SOC) design.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes 2 cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 908 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, a first and second hardware blocks execution logics may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

Figure 10:
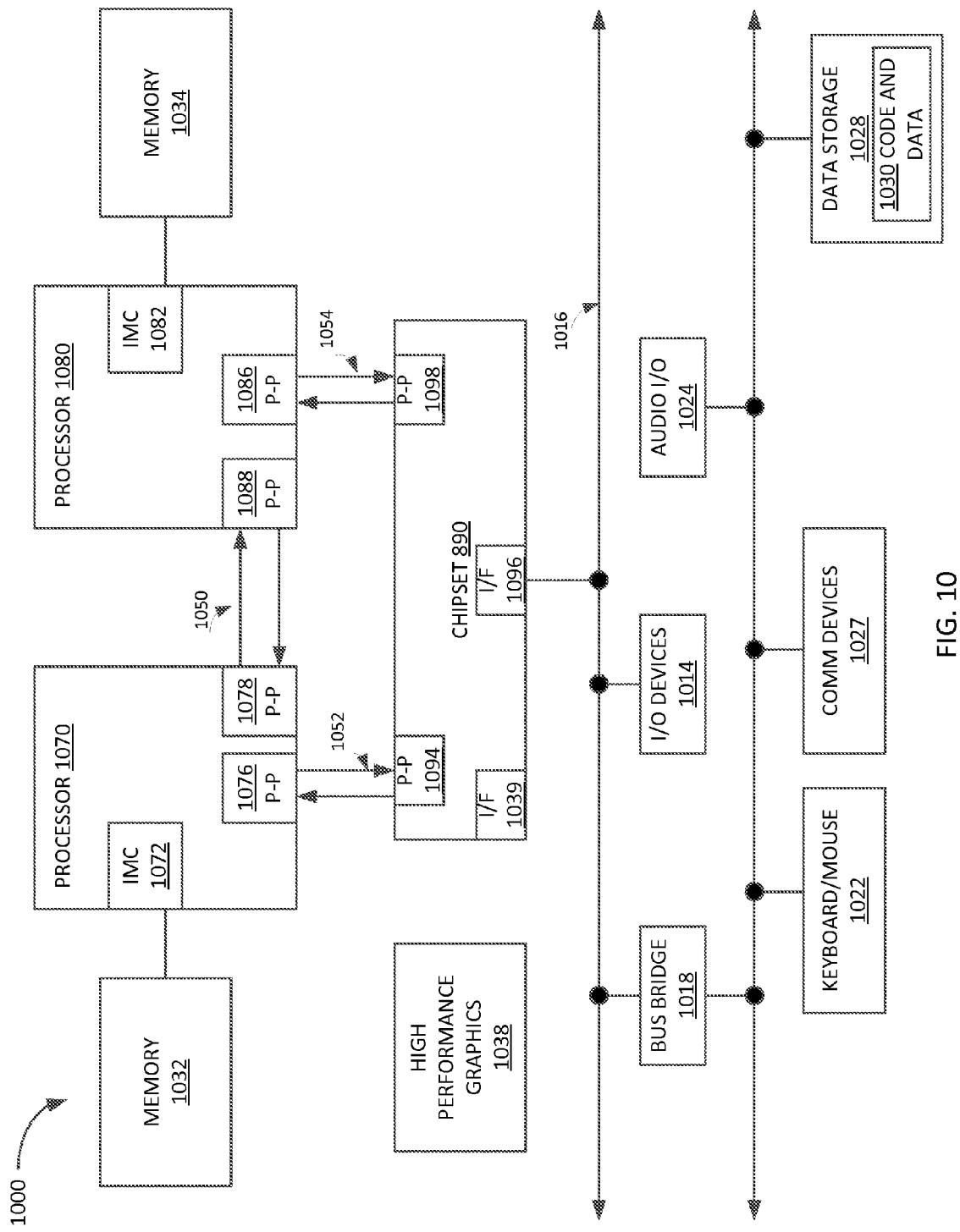
FIG. 10 illustrates a block diagram of a computer system according to one embodiment.

Referring now to FIG. 10, shown is a block diagram of a system 1000 in accordance with an embodiment of the invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processors of the computing systems as described herein. In one embodiment, processors 1070, 1080 manage shared resources in multiple processing devices.

While shown with two processors 1070, 1080, it is to be understood that the scope of the disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070 and 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
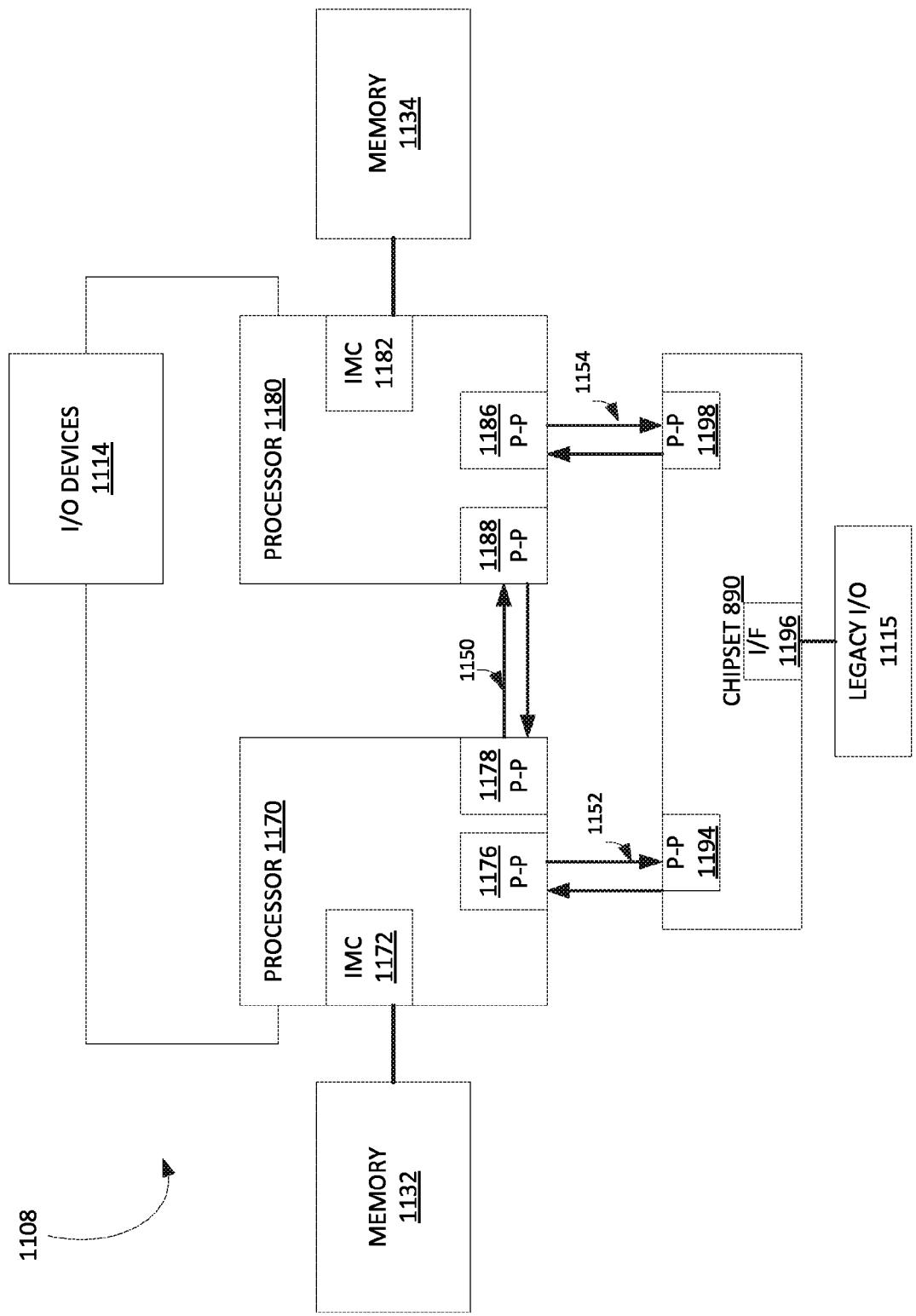
FIG. 11 illustrates a block diagram of a computer system according to one embodiment.

Referring now to FIG. 11, shown is a block diagram of a system 1100 in accordance with an embodiment of the invention. FIG. 11 illustrates processors 1170, 1180. In one embodiment, processors 1170, 1180 manage shared resources of multiple processing devices. Furthermore, processors 1170, 1180 may include integrated memory and I/O control logic ("CL") 1172 and 1182, respectively and intercommunicate with each other via point-to-point interconnect 1150 between point-to-point (P-P) interfaces 1178 and 1188 respectively. Processors 1170, 1180 each communicate with chipset 1190 via point-to-point interconnect 1152 and 1154 through the respective P-P interfaces 1176 to 1194 and 1186 to 1198 as shown. For at least one embodiment, the CL 1172, 1182 may include integrated memory controller units. CLs 1172, 1182 may include I/O control logic. As depicted, memories 1132, 1134 coupled to CLs 1172, 1182 and I/O devices 1114 are also coupled to the control logic 1172, 1182. Legacy I/O devices 1115 are coupled to the chipset 1190 via interface 1196.

Figure 12:
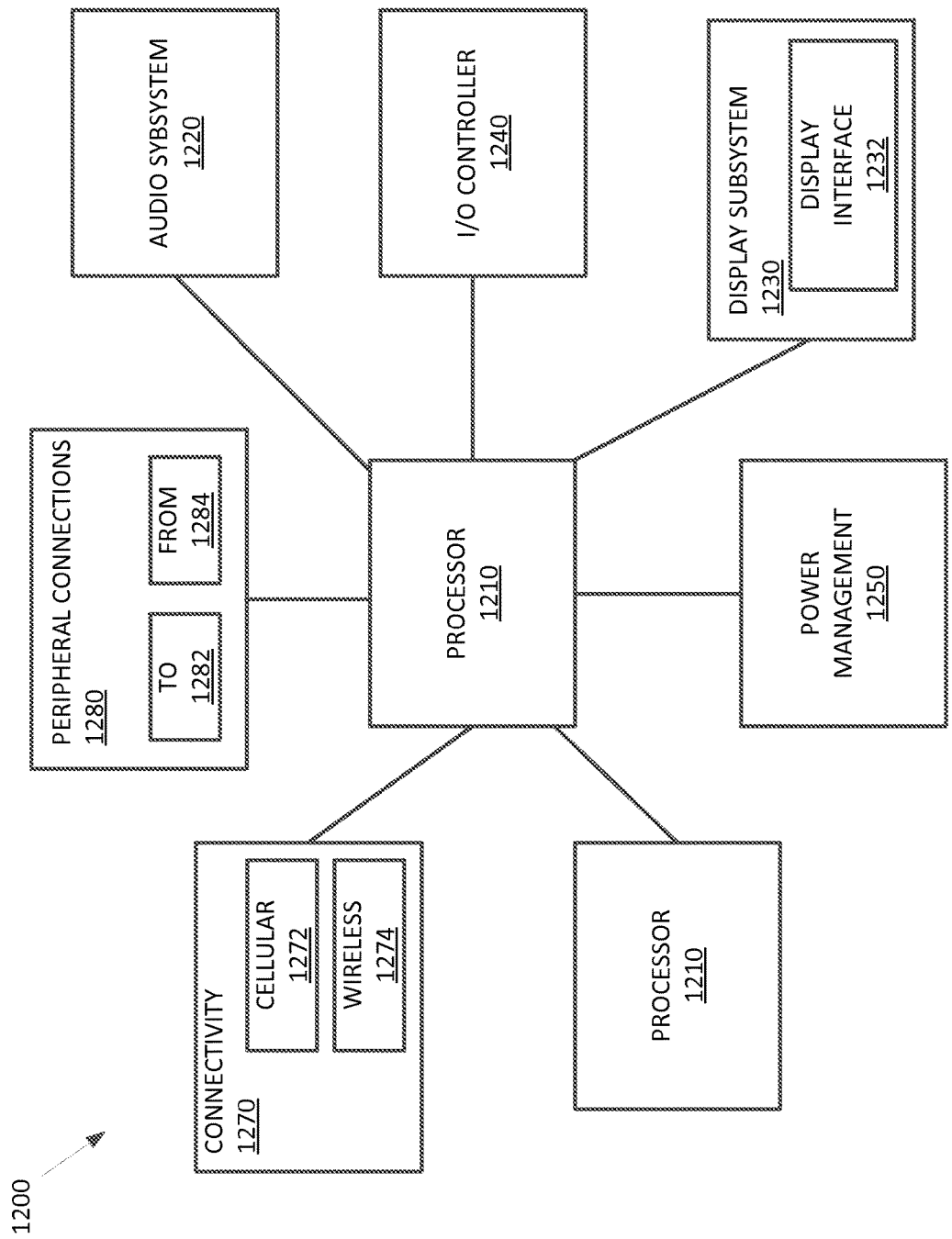
FIG. 12 illustrates block diagram of an embodiment of tablet computing device, a smartphone, or other mobile device in which touchscreen interface connectors are used.

FIG. 12 illustrates a block diagram 1200 of an embodiment of tablet computing device, a smartphone, or other mobile device in which touchscreen interface connectors may be used. Processor 1210 may manage shared resources of multiple processing devices. In addition, processor 1210 performs the primary processing operations. Audio subsystem 1220 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1210.

Display subsystem 1232 represents hardware (e.g., display devices) and software (e.g., drivers) components that provide a visual and/or tactile display for a user to interact with the tablet computing device or smartphone. Display subsystem 1230 includes display interface 1232, which includes the particular screen or hardware device used to provide a display to a user. In one embodiment, display subsystem 1230 includes a touchscreen device that provides both output and input to a user.

I/O controller 1240 represents hardware devices and software components related to interaction with a user. I/O controller 1240 can operate to manage hardware that is part of audio subsystem 1220 and/or display subsystem 1230. Additionally, I/O controller 1240 illustrates a connection point for additional devices that connect to the tablet computing device or smartphone through which a user might interact. In one embodiment, I/O controller 1240 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1250 that manages battery power usage, charging of the battery, and features related to power saving operation. Memory subsystem 1260 includes memory devices for storing information in the tablet computing device or smartphone. Connectivity 1270 includes hardware devices (e.g., wireless and/or wired connectors and communication hardware) and software components (e.g., drivers, protocol stacks) to the tablet computing device or smartphone to communicate with external devices. Cellular connectivity 1272 may include, for example, wireless carriers such as GSM (global system for mobile communications), CDMA (code division multiple access), TDM (time division multiplexing), or other cellular service standards). Wireless connectivity 1274 may include, for example, activity that is not cellular, such as personal area networks (e.g., Bluetooth), local area networks (e.g., WiFi), and/or wide area networks (e.g., WiMax), or other wireless communication.

Peripheral connections 1280 include hardware interfaces and connectors, as well as software components (e.g., drivers, protocol stacks) to make peripheral connections as a peripheral device ("to" 1282) to other computing devices, as well as have peripheral devices ("from" 1284) connected to the tablet computing device or smartphone, including, for example, a "docking" connector to connect with other computing devices. Peripheral connections 1280 include common or standards-based connectors, such as a Universal Serial Bus (USB) connector, DisplayPort including MiniDisplayPort (MDP), High Definition Multimedia Interface (HDMI), Firewire, etc.

Figure 13:
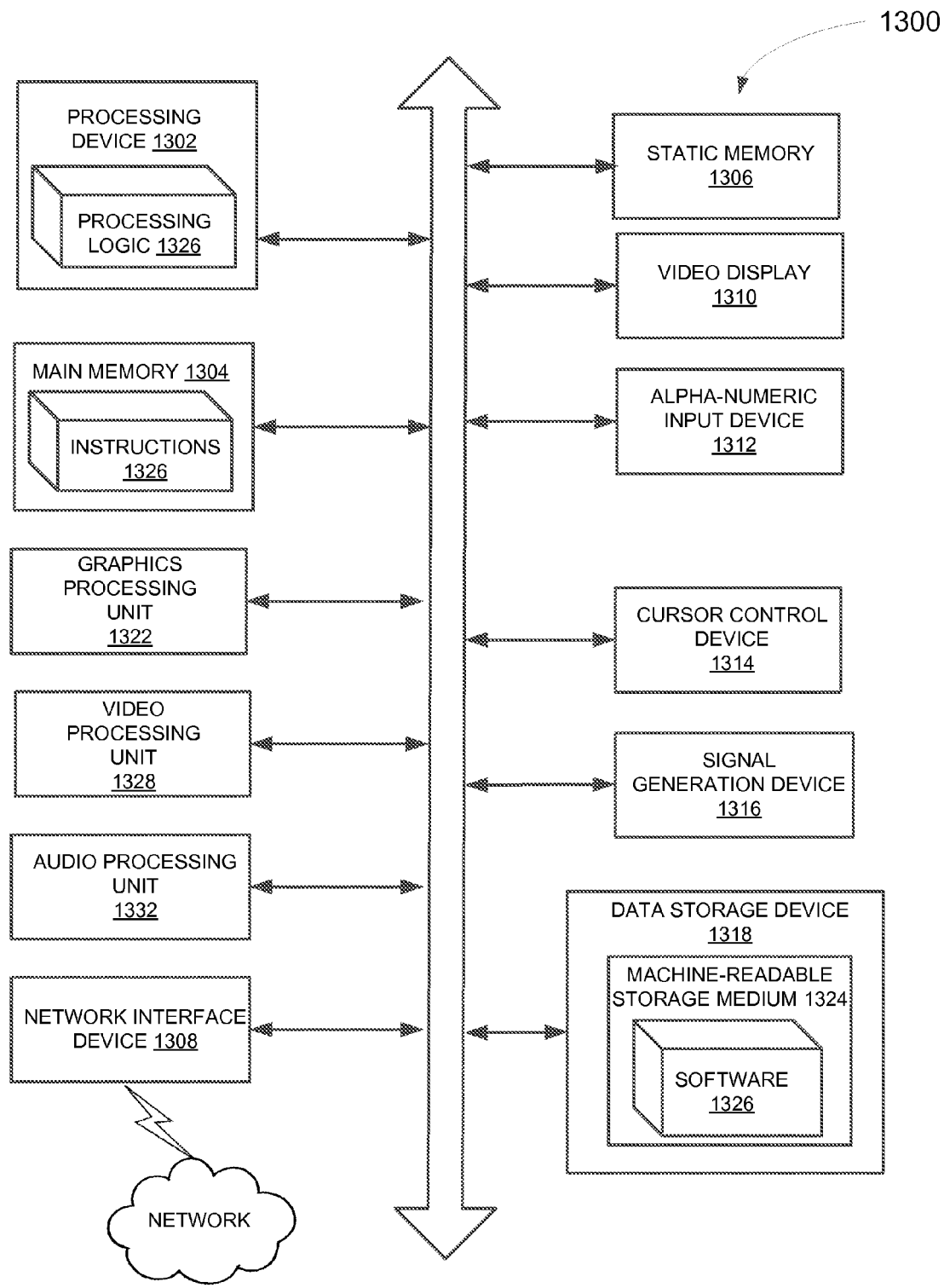
FIG. 13 illustrates a diagrammatic representation of a machine in the example form of a computer system within which a set of instructions, for causing the machine to perform any one or more of the methodologies discussed herein, may be executed.

FIG. 13 illustrates a diagrammatic representation of a machine in the example form of a computing system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations discussed herein. In one embodiment, processing device 1302 is the same as computer system 100 described with respect to FIG. 1 that implements the first hardware block (hw) 130 and second hardware block (hw) 132. Alternatively, the computing system 1300 can include other components as described herein.

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another embodiment, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the first hardware block (hw) 130 and the second hardware block (hw) 132, such as described with respect to FIG. 1, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing device managing shared resources between multiple processing devices comprising a first processing device comprising a first non-coherent hardware block (hb) comprising non-coherent data, a second processing device comprising a second non-coherent hb comprising the non-coherent data and a first hb in communication with the first non-coherent hb and the second non-coherent hb via a bus interface to track the non-coherent data in each of the first non-coherent hb and the second non-coherent hb.

In Example 2, the subject matter of Example 1 can optionally include wherein the first hb filters the non-coherent data in the first non-coherent hb of the first processing device and the second non-coherent hb of the second processing device.

In Example 3, the subject matter of any one of Examples 1-2 can optionally include wherein the first hb comprises a non-coherent data cross-stack and assigns the first and the second processing devices to a section of the non-coherent data stack.

In Example 4, the subject matter of any one of Examples 1-3 can optionally include wherein the first hb function to provide, via the section of the non-coherent data stack, access to share the non-coherent data between the first non-coherent hb of the first processing device and the second non-coherent hb of the second processing device.

In Example 5, the subject matter of any one of Examples 1-4 can optionally include wherein the first processing device comprise a first coherent hb and the second processing device comprising a second coherent hb, wherein the first and the second hb comprise coherent data.

In Example 6, the subject matter of any one of Examples 1-4 can optionally include a second hb in communication with the first coherent hb and the second coherent hb via the bus interface to coordinate the coherent data between the first coherent hb and the second coherent hb.

In Example 7, the subject matter of any one of Examples 1-6 can optionally include wherein the second hb to share the coordinated coherent data between the first and the second processing devices.

Example 8 is a system managing shared resources between multiple processing devices includes a memory and a processor communicably coupled to the memory, the processor includes a first processing device comprising a first non-coherent hardware block (hb) comprising non-coherent data, a second processing device comprising a second non-coherent hb comprising the non-coherent data and a first hb in communication with the first non-coherent hb and the second non-coherent hb via a bus interface to track the non-coherent data in each of the first non-coherent hb and the second non-coherent hb.

In Example 9, the subject matter of Example 8 can optionally include wherein the first hb comprises a non-coherent data cross-stack and assigns the first and the second processing devices to a section of the non-coherent data stack.

In Example 10, the subject matter of any one of Examples 8-9 can optionally include wherein the first hb function to provide, via the section of the non-coherent data stack, access to share the non-coherent data between the first non-coherent hb of the first processing device and the second non-coherent hb of the second processing device.

In Example 11, the subject matter of any one of Examples 8-10, can optionally include wherein the first processing device comprise a first coherent hb and the second processing device comprising a second coherent hb, wherein the first and the second hb comprise coherent data.

In Example 12, the subject matter of any one of Examples 8-11 can optionally include wherein the second hb in communication with the first coherent hb and the second coherent hb via the bus interface to coordinate the coherent data between the first coherent hb and the second coherent hb.

Example 13 is a method for managing shared resources between multiple processing devices comprising tracking, by a processor, a non-coherent data in a first non-coherent hardware block (hb) of a first processing device and a second non-coherent hb of a second processing device, wherein the processor comprise a first hardware block.

In Example 14, the subject matter of Example 13 can optionally include assigning the first and the second processing devices to a section of a non-coherent data stack in the first hardware block.

In Example 15, the subject matter of any one of Examples 13-14 can optionally include sharing the non-coherent data between the first non-coherent hb of the first processing device and the second non-coherent hb of the second processing device via the non-coherent data stack in the first hardware block.

In Example 16, the subject matter of any one of Examples 13-15 can optionally include coordinating coherent data between the first processing device and the second processing device via a second hardware block.

Example 17 is a non-transitory machine-readable storage medium for managing shared resources between multiple processing devices. In Example 17, the non-transitory machine-readable medium includes data that, when accessed by a processing device, cause the processing device to perform operations comprising tracking, by a processor, a non-coherent data in a first non-coherent hardware block (hb) of a first processing device and a second non-coherent hb of a second processing device, wherein the processor comprise a first hardware block.

In Example 18, the subject matter of Example 17 can optional include wherein the operations further comprising assigning the first and the second processing devices to a section of a non-coherent data stack in the first hardware block.

In Example 19, the subject matter of any one of Examples 17-18 an optional include wherein the operations further comprising sharing the non-coherent data between the first non-coherent hb of the first processing device and the second non-coherent hb of the second processing device via the non-coherent data stack in the first hardware block.

In Example 20, the subject matter of any one of Examples 17-19 can optionally include wherein the operations further comprising coordinating coherent data between the first processing device and the second processing device via a second hardware block.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A first processing device comprising:
    a first processing core; and
    a first non-coherent hardware block communicably coupled to the first processing core, the first non-coherent hardware block comprising non-coherent data that is tracked by a first hardware block in communication, via a bus interface, with the first non-coherent hardware block;
    wherein the first hardware block to assign the first processing device and a second processing device to a section of a cross-stack structure such that the first hardware block provides, via the section of the cross-stack structure, access to share the non-coherent data between the first non-coherent hardware block of the first processing device and a second non-coherent block of the second processing device.

2. The first processing device of claim 1 wherein the first hardware block filters the non-coherent data in the first non-coherent hardware block of the first processing device and the second non-coherent hardware block of the second processing device.

3. The first processing device of claim 1 further comprising a first coherent hardware block, wherein the second processing device comprises a second coherent hardware block, wherein the first and the second coherent hardware blocks comprise coherent data.

4. The first processing device of claim 3 wherein a second hardware block is in communication with the first coherent hardware block and the second coherent hardware block via the bus interface to coordinate the coherent data between the first coherent hardware block and the second coherent hardware block.

5. The first processing device of claim 4 wherein the second hardware block to share the coordinated coherent data between the first and the second processing devices.

6. A system comprising:
    a memory;
    a first processing device communicably coupled to the memory, the first processing device comprising a first non-coherent hardware block comprising non-coherent data;
    a second processing device communicably coupled to the memory, the second processing device comprising a second non-coherent hardware block comprising the non-coherent data; and
    a first hardware block in communication with the first non-coherent hardware block and the second non-coherent hardware block via a bus interface to assign the first and the second processing devices to a section of a cross-stack structure such that the first hardware block provides, via the section of the cross-stack structure, access to share the non-coherent data between the first non-coherent hardware block of the first processing device and the second non-coherent block of the second processing device.

7. The system of claim 6 wherein the first processing device further comprises a first coherent hardware block and the second processing device comprises a second coherent hardware block, wherein the first and the second hardware blocks comprise coherent data.

8. The system of claim 7 wherein a second hardware block is communicably coupled with the first coherent hardware block and the second coherent hardware block via the bus interface and is to coordinate the coherent data between the first coherent hardware block and the second coherent hardware block.

9. A method comprising:
    assigning via a section of a cross-stack structure of a first hardware block to a first processing device and a second processing device, wherein the first processing device comprising a first non-coherent hardware block comprising non-coherent data and the second processing device comprising a second non-coherent hardware block comprising the non-coherent data; and
    sharing, via the section of the cross-stack structure of the first hardware block, the non-coherent data between the first non-coherent hardware block of the first processing device and a second non-coherent block of the second processing device.

10. The method of claim 9 further comprising coordinating coherent data between the first processing device and the second processing device via a second hardware block.

11. The system of claim 6, wherein the first hardware block is to filter, via the cross-stack structure, the non-coherent data in the first non-coherent hardware block of the first processing device and the second non-coherent hardware block of the second processing device.

12. The system of claim 8, wherein the second hardware block to share the coordinated coherent data between the first and the second processing devices.

13. The method of claim 9, further comprising filtering, via the cross-stack structure, the non-coherent data in the first non-coherent hardware block and the second non-coherent hardware block.

14. The method of claim 10, wherein the second hardware block to share the coordinated coherent data between the first and the second processing devices.

15. The first processing device of claim 1 wherein the first hardware block to track the non-coherent data in each of the first non-coherent hardware block and the second non-coherent hardware block using the cross-stack structure of the first hardware block.

16. The system of claim 6 wherein the first hardware block to track the non-coherent data in each of the first non-coherent hardware block of the first processing device and the second non-coherent hardware block of the second processing device using the cross-stack structure of the first hardware block.

17. The method of claim 9 further comprising tracking, via the cross-structure of the first hardware block, the non-coherent data in each of the first non-coherent hardware block of the first processing device and the second non-coherent hardware block of the second processing device.

18. The first processing device of claim 1 wherein the second hardware block to track the coherent data in each of the first coherent hardware block and the second coherent hardware block.

19. The system of claim 8 wherein the second hardware block to track the coherent data in each of the first coherent hardware block and the second coherent hardware block of the second processing device.

20. The method of claim of 9 further comprising tracking the coherent data of the first processing device and the second processing device via a second hardware block.

\* \* \* \* \*